US005756568A

United States Patent [19]
Morita et al.

[11] Patent Number: 5,756,568
[45] Date of Patent: May 26, 1998

[54] COMPOSITE CURED SILICONE POWDER AND METHOD FOR THE PREPARATION THEREOF

[75] Inventors: Yoshitsugu Morita; Atsushi Sasaki, both of Chiba Prefecture, Japan

[73] Assignee: Dow Corning Toray Silicone Co., Ltd., Tokyo, Japan

[21] Appl. No.: 748,441

[22] Filed: Nov. 13, 1996

[30] Foreign Application Priority Data

Nov. 30, 1995 [JP] Japan .................. 7-336111

[51] Int. Cl.$^6$ .................. C08K 5/54
[52] U.S. Cl. .................. 524/268; 524/588; 523/209; 523/216; 523/220; 428/403; 428/405; 428/407; 106/287.1
[58] Field of Search .................. 524/268, 588; 523/209, 216, 220; 428/403, 405, 407; 106/287.1

[56] References Cited

U.S. PATENT DOCUMENTS

| | | | |
|---|---|---|---|
| 3,691,128 | 9/1972 | Vincent | 260/34.2 |
| 4,594,134 | 6/1986 | Hanada et al. | 522/99 |
| 4,742,142 | 5/1988 | Shimizu et al. | 528/15 |
| 4,743,670 | 5/1988 | Yoshida et al. | 528/15 |
| 5,153,238 | 10/1992 | Bilgrien et al. | 523/211 |
| 5,387,624 | 2/1995 | Morita et al. | 523/220 |

FOREIGN PATENT DOCUMENTS

| | | |
|---|---|---|
| 0 304 946 | 5/1989 | European Pat. Off. . |
| 0 350 519 | 1/1990 | European Pat. Off. . |
| 0 516 057 | 12/1992 | European Pat. Off. . |
| 0 647 672 | 4/1995 | European Pat. Off. . |
| 685508 | 12/1995 | European Pat. Off. . |

*Primary Examiner*—Karen A. Dean
*Attorney, Agent, or Firm*—Alexander Weitz

[57] ABSTRACT

There is disclosed a composite powder composition which has excellent flowability and water repellency and finds utility as a modifier for paints and organic resins, said composition comprising:

(A) 100 parts by weight of a cured silicone powder that has an average particle size of 0.1 to 100 micrometers and contains a non-crosslinking silicone oil; and (B) 0.1 to 100 parts by weight of a microfine inorganic powder, said inorganic powder being coated on the surface of said cured silicone powder.

14 Claims, No Drawings

COMPOSITE CURED SILICONE POWDER AND METHOD FOR THE PREPARATION THEREOF

FIELD OF THE INVENTION

This invention relates to composite cured silicone powders comprising cured silicone powder whose surface is coated with microfine inorganic powder and to methods for the preparation thereof. More particularly, this invention relates to a very flowable and strongly water repellent composite cured silicone powder and to a method for the preparation of this composite cured silicone powder.

BACKGROUND OF THE INVENTION

Cured silicone powders are used as additives in, for example, cosmetics, paints, inks, thermosetting organic resins, and thermoplastic organic resins. Cured silicone powders are particularly well suited for use as internal stress relaxers for thermosetting organic resins and as surface lubricants for organic resin films.

Cured silicone powders can be produced, for example, by grinding silicone rubber, by curing a liquid silicone rubber composition while spray drying (refer to Japanese Patent Application Laid Open Number Sho 59-68333 (68,333/1984), and by curing a liquid silicone rubber composition while it is dispersed in water (refer to Japanese Patent Application Laid Open Numbers Sho 62-243621, Sho 63-77942, Sho 63-202658, and Sho 64-70558. However, the cured silicone powders afforded by these methods have a strong tendency to aggregate and, as a result, have a poor flowability. Further, they cannot be uniformly dispersed in organic resins, e.g., thermosetting organic resins and thermoplastic organic resins.

Composite cured silicone powders with an improved flowability have been proposed in order to solve these problems. These composite cured silicone powders comprise cured silicone powder whose surface has been coated with a microfine inorganic powder (refer to Japanese Patent Application Laid Open Numbers Hei 4-348143, Hei 5-179144, and Hei 7-102075). These composite cured silicone powders, however, exhibit a poor water repellency and thus have a poor affinity for organic resins in those applications where they are blended with organic resins.

SUMMARY OF THE INVENTION

The object of the present invention is to provide a very flowable and highly water repellent composite cured silicone powder and a method for the preparation of this composite cured silicone powder.

The composite cured silicone powder according to the present invention characteristically comprises cured silicone powder that has an average particle size from 0.1 to 100 micrometers and contains non-crosslinking silicone oil, the surface of which is coated with a microfine inorganic powder.

In addition, the method for the preparation of the composite cured silicone powder according to the present invention comprises mixing cured silicone powder that has an average particle size from 0.1 to 100 micrometers and contains non-crosslinking silicone oil with microfine inorganic powder under mechanical shear.

DETAILED DESCRIPTION OF THE INVENTION

The composite cured silicone powder according to the present invention is a cured silicone powder whose surface has been coated with a microfine inorganic powder. The average particle size of the cured silicone powder should be from about 0.1 to about 100 micrometers and preferably is from 0.5 to 80 micrometers. Coating the surface of cured silicone powder with microfine inorganic powder becomes highly problematic when the average particle size of the cured silicone powder is below about 0.1 micrometer. On the other hand, composite cured silicone powder prepared from cured silicone powder having an average particle size above about 100 micrometers is not readily dispersible in organic resins. The cured silicone powder can be, for example, a silicone gel powder, silicone rubber powder, or silicone resin powder, wherein silicone rubber powder is particularly preferred. The cured silicone powder can be prepared by curing based on, for example, addition reaction, condensation reaction, organoperoxide, ultraviolet radiation, and the like. Particularly preferred are cured silicone powders prepared by curing through addition reaction or condensation reaction. The physical properties of the cured silicone powder are not critical, but the JIS (Japanese Industrial Standard) A durometer hardness preferably does not exceed 50 when the cured silicone powder is a silicone rubber powder.

The non-crosslinking silicone oil present in the cured silicone powder is simply present in the cured silicone powder in the form of silicone oil that has not participated in the curing reaction that generated the cured silicone powder. The molecular structure of the non-crosslinking silicone oil can be, for example, straight chain, partially branched straight chain, cyclic, or branched chain with straight-chain molecular structures being preferred. The viscosity at 25° C. of the non-crosslinking silicone oil is, for example, preferably from about 1 to about 10,000 centipoise and more preferably from 5 to 1,000 centipoise. When the non-crosslinking silicone oil has a viscosity of less than about 1 centipoise at 25° C., the volatility of the non-crosslinking silicone oil will substantially prevent a durable water repellency from being imparted to the resulting composite cured silicone powder. At the other end of the range, it becomes difficult to make cured silicone powder with an average particle size no greater than 100 micrometers when the non-crosslinking silicone oil has a viscosity at 25° C. in excess of about 10,000 centipoise.

The subject non-crosslinking silicone oil is generally exemplified by trimethylsiloxy-endblocked dimethylpolysiloxanes, trimethylsiloxy-endblocked dimethylsiloxane-methylphenylsiloxane copolymers, and trimethylsiloxy-endblocked dimethylsiloxane-methyl(3,3,3-trifluoropropyl)siloxane copolymers. When the cured silicone powder is obtained by an addition reaction-based cure, the non-crosslinking silicone oil can also be, for example, silanol-endblocked dimethylpolysiloxanes, silanol-endblocked dimethylsiloxane-methylphenylsiloxane copolymers, and silanol-endblocked dimethylsiloxane-methyl(3,3,3-trifluoropropyl)siloxane copolymers. When the cured silicone powder is obtained through a condensation reaction-based cure, the non-crosslinking silicone oil can also be, for example, dimethylvinylsiloxy-endblocked dimethylpolysiloxanes, dimethylvinylsiloxy-endblocked dimethylsiloxane-methylphenylsiloxane copolymers, dimethylvinylsiloxy-endblocked dimethylsiloxane-methyl (3,3,3-trifluoropropyl) siloxane copolymers, trimethylsiloxy-endblocked methylvinylpolysiloxanes, and trimethylsiloxy-endblocked dimethylsiloxane-methylvinylsiloxane copolymers.

The content of the non-crosslinking silicone oil in the cured silicone powder is preferably from about 0.5 to about 80 weight % and more preferably from 10 to 50 weights.

Little water repellency can be imparted to the ultimately obtained composite cured silicone powder when the cured silicone powder contains less than about 0.5 weight % non-crosslinking silicone oil. When the non-crosslinking silicone oil content exceeds about 80 weight %, the non-crosslinking silicone oil has a pronounced tendency to bleed from the corresponding composite cured silicone powder.

The above-described non-crosslinking silicone oil-containing cured silicone powder can be prepared, for example, by curing a curable silicone composition and then pulverizing the cured silicone with a pulverizing device such as a grinder, by curing a curable silicone composition by spraying it in a spraying device such as a spray dryer, or by curing a curable silicone composition while it is dispersed in water or aqueous surfactant solution. The curable silicone composition used in these methods is exemplified by the following: addition reaction-curing silicone compositions comprising organopolysiloxane having at least 2 alkenyl in each molecule, organopolysiloxane having at least 2 silicon-bonded hydrogen in each molecule, non-crosslinking silicone oil, and a platinum compound; condensation reaction-curing silicone compositions comprising organopolysiloxane having at least 2 silicon-bonded hydroxyl groups or hydrolyzable groups wherein said hydrolyzable groups are exemplified by alkoxy, oxime, acetoxy, and aminoxy, silane crosslinker having at least 3 silicon-bonded hydrolyzable groups in each molecule wherein said hydrolyzable groups are exemplified by alkoxy, oxime, acetoxy, and aminoxy, non-crosslinking silicone oil, and a condensation reaction catalyst such as an organotin compound or organotitanium compound; and organoperoxide-curing silicone compositions comprising diorganopolysiloxane having at least 1 alkenyl in each molecule, non-crosslinking silicone oil, and organoperoxide.

Among the preceding methods for preparing cured silicone powder, curing a curable silicone composition as described above while the composition is dispersed in water or aqueous surfactant solution is the particularly preferred method for obtaining spherical cured silicone powder that is highly dispersible in organic resins. A non-crosslinking silicone oil-free cured silicone powder prepared by this method will generally be hydrophilic since it is prepared in water and can have surfactant adhering to it, and coating its surface with microfine inorganic powder is already associated with problems in the manifestation of water repellency. However, this method remains the particularly preferred method for preparing the cured silicone powder because a strong water repellency can still be imparted to the composite cured silicone powder through the use of non-crosslinking silicone oil-containing cured silicone powder, as in the case of the composite cured silicone powder according to the present invention. The waterborne dispersion of the curable silicone composition can be prepared, for example, using an agitating device such as a homogenizer or colloid mill or a mixer such as an ultrasound vibrator. In this sequence the curable silicone composition is preferably cooled before preparation of the waterborne dispersion in order to inhibit or control its cure. The use of an aqueous surfactant solution is preferred in order to stabilize the curable silicone composition in particulate form in the waterborne dispersion. The surfactant is preferably added at a level of about 0.1 to 20 weight parts, preferably 0.5 to 10 weight parts, per 100 weight parts of the curable silicone composition. The water is preferably used at from about 40 to 2,000 weight parts, preferably 40 to 1,000 weight parts, per 100 weight parts of the curable silicone composition. The preparation of a homogeneous waterborne dispersion of the curable silicone composition becomes quite problematic when the water is used at less than about 40 weight parts per 100 weight parts of the curable silicone composition. On the other hand, the use of more than about 2,000 weight parts of water leads to a substantial decline in the productivity of cured silicone powder preparation. The water used is preferably ion-exchanged water that contains little metal ion or halogen ion and has a conductivity not exceeding 1 microS/cm and in particular not exceeding 0.5 microS/cm. The use of such an ion-exchanged water facilitates stabilization of the waterborne dispersion of the curable silicone composition.

The waterborne dispersion of the curable silicone composition prepared by the method described above is then held at room or elevated temperature in order to cure the curable silicone composition present in the waterborne dispersion and provide a waterborne dispersion of cured silicone powder. When heating is applied to the waterborne dispersion of the curable silicone composition, the heating temperature preferably does not exceed 100° C. and more preferably is from 10° C. to 95° C. Heat can be applied to the waterborne dispersion of the curable silicone composition, for example, by the direct application of heat to the waterborne dispersion or by adding the waterborne dispersion to hot water. The cured silicone powder is then recovered by eliminating the water from the waterborne dispersion of the cured silicone powder. The water can be removed from the waterborne dispersion of the cured silicone powder using, for example, a vacuum dryer, a forced convection oven, or a spray dryer.

The microfine inorganic powder for coating on the surface of the resulting cured silicone powder is exemplified by the microfine powders of metal oxides such as silicon oxide, titanium oxide, aluminum oxide, zirconium oxide, antimony oxide, and the like; the microfine powders of metal nitrides such as boron nitride, aluminum nitride, and the like; and by microfine sulfide powders and microfine chloride powders. Microfine metal oxide powders are particularly preferred. Moreover, the surface of the microfine inorganic powder can be hydrophobicized by treatment with an organosilicon compound such as an organoalkoxysilane, organochlorosilane, organosilazane, and the like.

The microfine inorganic powder should have a particle size appropriate for coating the surface of the cured silicone powder, and in specific terms preferably has a particle size not exceeding one-tenth the average particle size of the cured silicone powder and preferably has a specific surface area of at least 10 m2/g.

The preparative method according to the present invention is characterized by mixing non-crosslinking silicone oil-containing cured silicone powder with an average particle size of 0.1 to 100 micrometers with microfine inorganic powder under mechanical shear. The device for mixing these powders under mechanical shear is exemplified by the Henschel™ mixer and Super mixer. The temperature during powder mixing is not critical, and mixing can be conducted, for example, at room temperature. Given that flowability is being imparted to poorly flowable cured silicone powder by coating its surface with microfine inorganic powder, the suitable mixing time must be determined by inspecting the change in the status of the cured silicone powder.

The microfine inorganic powder is added in the preparative method according to the present invention in a quantity sufficient to coat the surface of the cured silicone powder. Although this quantity will also vary as a function of the non-crosslinking silicone oil content of the cured silicone powder, additions of about 0.1 to about 100 weight parts per 100 weight parts of the cured silicone powder are generally preferred and additions of 1 to 50 weight parts per 100 weight parts of the cured silicone powder are particularly preferred.

The composite cured silicone powder according to the present invention exhibits an excellent flowability and a strong water repellency and as a consequence exhibits an excellent affinity for and dispersibility in organic compounds and organic resins. The composite cured silicone powder according to the present invention can therefore be used as an additive or modifier for paints, organic resins, and the like.

EXAMPLES

The composite cured silicone powder according to the present invention and its method of preparation will be explained in greater detail below with reference to working examples. The viscosity values reported in the examples were measured at 25° C. The properties of the cured silicone powders and composite cured silicone powders were measured as follows.

JIS A durometer hardness of the cured silicone powders

The curable silicone composition was cured into a sheet, and the durometer hardness of this sheet was measured using the JIS A durometer hardness instrument described in JIS K-6301.

Average particle size

The average particle size of the cured silicone powder was measured using an image processor connected to an optical microscope.

Flowability

This was evaluated by measuring the weight % powder (cured silicone powder or composite cured silicone powder) retained on the mesh using an Air-Jet Sieve from the Alpine Company and a 100-mesh sieve drum (mesh opening=150 micrometers).

Water repellency

One gram of the cured silicone powder or composite cured silicone powder was introduced into 100 mL water and mixed with a stirrer. A score of "+" for water repellent was rendered when the cured silicone powder or composite cured silicone powder was incompatible with the water and floated on the surface of the water. A score of "x" for hydrophilic was rendered when the sample was compatible with the water and settled in the water and/or became suspended within the water.

Reference Example 1

A composition (I) was prepared by mixing the following to homogeneity: 28 weight parts of dimethylvinylsiloxy-endblocked dimethylpolysiloxane with a vinyl equivalent weight of 8,000, 7 weight parts of dimethylhydrogensiloxy-endblocked dimethylsiloxane-methylhydrogensiloxane copolymer with a viscosity of 20 centipoise having the following formula

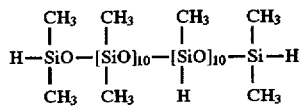

and 15 weight parts of trimethylsiloxy-endblocked dimethylpolysiloxane with a viscosity of 100 centipoise.

A composition (II) was prepared by mixing the following to homogeneity: 33 weight parts of the above-described dimethylvinylsiloxy-endblocked dimethylpolysiloxane, 16 weight parts trimethylsiloxy-endblocked dimethylpolysiloxane with a viscosity of 100 centipoise, and isopropanolic chloroplatinic acid solution in sufficient quantity to give 20 weight-ppm platinum metal per 100 weight parts of the above-described dimethylvinylsiloxy-endblocked dimethylpolysiloxane.

Compositions (I) and (II) were then mixed in their entirety to homogeneity at 5° C. to give a silicone rubber composition, which was quickly mixed into an aqueous solution (25° C.) of 200 weight parts of pure water (electrical conductivity=0.2 microS/cm) and 4 weight parts of polyoxyethylene nonylphenyl ether (HLB=13.1). Mixing this in a homogenizer (300 kgf/cm$^2$) yielded a homogeneous waterborne emulsion of the silicone rubber composition. This waterborne emulsion of the silicone rubber composition was held at 30° C. for 6 hours to effect curing of the silicone rubber composition and give a waterborne dispersion of a silicone rubber powder. This waterborne dispersion of silicone rubber powder was heated at 80° C. for 1 hour and then dried in a spray dryer to give a spherical silicone rubber powder (A) that had an average particle size of 5 micrometers. Silicone rubber powder (A) had a JIS (Japanese Industrial Standard) A durometer hardness of 20.

Reference Example 2

A composition (III) was prepared by mixing the following to homogeneity: 20 weight parts of dimethylvinylsiloxy-endblocked dimethylpolysiloxane with a vinyl equivalent weight of 4,000, 11 weight parts of dimethylhydrogensiloxy-endblocked dimethylsiloxane-methylhydrogensiloxane copolymer with a viscosity of 20 centipoise having the following formula

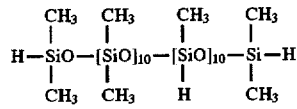

and 30 weight parts of trimethylsiloxy-endblocked dimethylpolysiloxane with a viscosity of 30 centipoise.

A composition (IV) was prepared by mixing the following to homogeneity: 50 weight parts of the above-described dimethylvinylsiloxy-endblocked dimethylpolysiloxane and isopropanolic chloroplatinic acid solution in sufficient quantity to give 20 weight-ppm platinum metal per 100 weight parts of the above-described dimethylvinylsiloxy-endblocked dimethylpolysiloxane.

Compositions (III) and (IV) were then mixed in their entirety to homogeneity at 5° C. to give a silicone rubber composition, which was quickly mixed into an aqueous solution (25° C.) of 200 weight parts of pure water (electrical conductivity=0.2 microS/cm) and 4 weight parts of polyoxyethylene nonylphenyl ether (HLB=13.1). Mixing this in a homogenizer (300 kgf/cm$^2$) yielded a homogeneous waterborne emulsion of the silicone rubber composition. This waterborne emulsion of the silicone rubber composition was held at 30° C. for 6 hours to effect curing of the silicone rubber composition and give a waterborne dispersion of a silicone rubber powder. This waterborne dispersion of silicone rubber powder was heated at 80° C. for 1 hour and then dried in an oven at 120° C. to give a spherical silicone rubber powder (B) that had an average particle size of 4 micrometers. Silicone rubber powder (B) had a JIS A durometer hardness of 25.

Reference Example 3

A composition (V) was prepared by mixing the following to homogeneity: 28 weight parts of dimethylvinylsiloxy-endblocked dimethylpolysiloxane with a vinyl equivalent weight of 8,000 and 7 weight parts of dimethylhydrogensiloxy-endblocked dimethylsiloxane-methylhydrogensiloxane copolymer with a viscosity of 20 centipoise having the following formula.

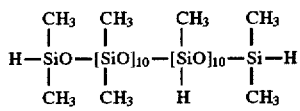

A composition (VI) was prepared by mixing the following to homogeneity: 33 weight parts of the above-described dimethylvinylsiloxy-endblocked dimethylpolysiloxane and isopropanolic chloroplatinic acid solution in sufficient quantity to give 20 weight-ppm of platinum metal per 100 weight parts of the above-described dimethylvinylsiloxy-endblocked dimethylpolysiloxane.

Compositions (V) and (VI) were then mixed in their entirety to homogeneity at 5° C. to give a silicone rubber composition, which was quickly mixed into an aqueous solution (25° C.) of 200 weight parts pure water (electrical conductivity =0.2 microS/cm) and 4 weight parts of polyoxyethylene nonylphenyl ether (HLB=13.1). Mixing this in a homogenizer (300 kgf/cm$^2$) yielded a homogeneous waterborne emulsion of the silicone rubber composition. This waterborne emulsion of the silicone rubber composition was held at 30° C. for 6 hours to effect curing of the silicone rubber composition and give a waterborne dispersion of a silicone rubber powder. This waterborne dispersion of silicone rubber powder was heated at 80° C. for 1 hour and then dried in a spray dryer to give a spherical silicone rubber powder (C) that had an average particle size of 5 micrometers. Silicone rubber powder (C) had a JIS (Japanese Industrial Standard) A durometer hardness of 40.

Example 1

One hundred weight parts of the silicone rubber powder (A) whose preparation is described in Reference Example 1 and 4 weight parts of microfine amorphous silica powder (specific surface=130 m$^2$/g) were mixed for 20 minutes at 2,000 rpm in a Henschel™ mixer to give a composite silicone rubber powder (D) whose surface was coated with the microfine amorphous silica powder.

Example 2

One hundred weight parts of the silicone rubber powder (A) whose preparation is described in Reference Example 1 and 8 weight parts of microfine hydrophobic titanium oxide powder (surface treated with hexamethyldisilazane, particle size=0.03 to 0.05 micrometer, specific surface=30 to 40 m$^2$/g) were mixed as in Example 1 to give a composite silicone rubber powder (E) whose surface was coated with the microfine hydrophobic titanium oxide powder.

Example 3

One hundred weight parts of the silicone rubber powder (B) whose preparation is described in Reference Example 2 and 4 weight parts of microfine amorphous silica powder (specific surface=130 m$^2$/g) were mixed as in Example 1 to give a composite silicone rubber powder (F) whose surface was coated with the microfine amorphous silica powder.

Comparative Example 1

One hundred weight parts of the silicone rubber powder (C) whose preparation is described in Reference Example 3 and 4 weight parts of microfine amorphous silica powder (specific surface=130 m$^2$/g) were mixed as in Example 1 to give a composite silicone rubber powder (G) whose surface was coated with the microfine amorphous silica powder.

Comparative Example 2

One hundred weight parts of the silicone rubber powder (C) whose preparation is described in Reference Example 3 and 5 weight parts of hydrophobic amorphous silica powder (surface treated with dimethyldichlorosilane, surface silanol density=1.2/100 square angstroms, primary particle size=16 millimicrons, specific surface=120 m$^2$/g) were mixed as in Example 1 to give a composite silicone rubber powder (H) whose surface was coated with the microfine hydrophobic amorphous silica powder.

TABLE 1

|  | reference examples | | | examples of the invention | | | | comp. examples | |
|---|---|---|---|---|---|---|---|---|---|
| silicone rubber powder | A | B | C | | | | | | |
| composite silicone rubber powder | | | | D | E | F | G | H | |
| average particle size in micrometers | 5 | 4 | 5 | 5 | 5 | 4 | 5 | 5 | |
| flowability: weight % on mesh | >95 | >95 | >95 | <5 | <5 | <5 | <5 | <5 | |
| water repellency | x | x | x | + | + | + | x | x | |

We claim:

1. A composition comprising:
   (A) 100 parts by weight of a cured silicone powder that has an average particle size of 0.1 to 100 micrometers and contains 0.5 to 80 weight percent of a non-crosslinking silicone oil; and
   (B) 0.1 to 100 parts by weight of a microfine inorganic powder, said inorganic powder being coated on the surface of said cured silicone powder.

2. The composition according to claim 1, wherein said microfine inorganic powder is a metal oxide.

3. The composition according to claim 1, wherein microfine inorganic powder has a specific surface area of at least 10 m$^2$/g.

4. The composition according to claim 1, wherein said cured silicone powder is silicone rubber powder.

5. The composition according to claim 4, wherein said inorganic powder is a metal oxide.

6. The composition according to claim 5, wherein said silicone rubber is polydimethylsiloxane and said non-crosslinking silicone oil is polydimethylsiloxane.

7. The composition according to claim 6, wherein said silicone rubber is cured by an addition reaction.

8. A method for the preparation of a composite cured silicone powder, said method comprising mixing
   (A) a cured silicone powder that has an average particle size of 0.1 to 100 micrometers And contains a non-crosslinking silicone oil with
   (B) a microfine inorganic powder, whereby said inorganic powder is coated on the surface of said cured silicone powder.

9. The method according to claim 8, wherein said microfine inorganic powder is a metal oxide.

10. The method according to claim 8, wherein microfine inorganic powder has a specific surface area of at least 10 $m^2/g$.

11. The method according to claim 8, wherein said cured silicone powder is silicone rubber powder.

12. The method according to claim 11, wherein said inorganic powder is a metal oxide.

13. The method according to claim 12, wherein said silicone rubber is polydimethylsiloxane and said non-crosslinking silicone oil is polydimethylsiloxane.

14. The method according to claim 13, wherein said silicone rubber is cured by an addition reaction.

* * * * *